(12) United States Patent
Rodi et al.

(10) Patent No.: US 9,376,269 B2
(45) Date of Patent: Jun. 28, 2016

(54) DEVICE FOR TRANSFERRING STACKS OF BLISTER PACKS

(71) Applicant: Uhlmann Pac-Systeme GmbH & Co. KG, Laupheim (DE)

(72) Inventors: Wolfgang Rodi, Laupheim/Baustetten (DE); Fritz Fochler, Kammeltal-Behlingen (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

(21) Appl. No.: 14/520,773

(22) Filed: Oct. 22, 2014

(65) Prior Publication Data

US 2015/0118000 A1 Apr. 30, 2015

(30) Foreign Application Priority Data

Oct. 28, 2013 (EP) .................................... 13190537

(51) Int. Cl.
  *B65B 35/50* (2006.01)
  *B65G 47/82* (2006.01)
  (Continued)

(52) U.S. Cl.
  CPC ............... *B65G 47/34* (2013.01); *B65B 35/50* (2013.01); *B65G 47/082* (2013.01); *B65H 3/32* (2013.01); *B65H 3/40* (2013.01); *B65H 9/06* (2013.01); *B65H 11/007* (2013.01); *B65H 2301/20* (2013.01); *B65H 2301/311* (2013.01); *B65H 2301/44338* (2013.01); *B65H 2404/61* (2013.01); *B65H 2405/10* (2013.01); *B65H 2701/19* (2013.01)

(58) Field of Classification Search
  CPC ............................... B65G 35/50; B65G 47/82

USPC ................ 198/575, 578, 597, 598, 604, 605, 198/803.13; 53/534, 539; 414/790.3, 790.4, 414/790.7, 793.5

See application file for complete search history.

(56) References Cited

U.S. PATENT DOCUMENTS 3,370,549 A * 2/1968 Livingston .............. B65B 35/50
 104/212
3,641,737 A 2/1972 Tamagni
(Continued)

FOREIGN PATENT DOCUMENTS

DE 2001742 A1 7/1970
EP 1602584 A1 12/2005
WO WO 2006/015656 A1 2/2006

OTHER PUBLICATIONS

EP Search Report for EP 13190537.4.

*Primary Examiner* — Douglas Hess
(74) *Attorney, Agent, or Firm* — Brinks Gilson & Lione

(57) ABSTRACT

The device for transferring stacks of blister packs comprises at least one transfer cassette for holding a stack of blister packs, the transfer cassette comprising a bottom element and at least two opposing side boundary elements. A transfer cassette motion unit serves to move the transfer cassette in the conveying direction and in a direction transverse to the conveying direction and is configured in such a way that the transfer cassette is movable from a loading position, in which it is loaded with the stack of blister packs, to an unloading position, in which the stack of blister packs is transferred to a compartment of a conveying device. During unloading, the transfer cassette is moved laterally out of the compartment and thus out of the unloading position in a direction transverse to the conveying direction, whereas the stack of blister packs remains on the conveying device.

20 Claims, 11 Drawing Sheets

(51) Int. Cl.
*B65G 47/34* (2006.01)
*B65G 47/08* (2006.01)
*B65H 3/32* (2006.01)
*B65H 3/40* (2006.01)
*B65H 9/06* (2006.01)
*B65H 11/00* (2006.01)

(56) References Cited

U.S. PATENT DOCUMENTS

| | | | | |
|---|---|---|---|---|
| 4,922,688 A * | 5/1990 | Langen | ................... | B65B 5/061 366/218 |
| 5,331,790 A | 7/1994 | Benner, Jr. et al. | | |
| 5,454,212 A * | 10/1995 | Tanaka | ..................... | B65B 5/10 53/252 |
| 5,579,894 A * | 12/1996 | Glazier | ................... | B65B 35/44 198/431 |
| 5,787,680 A * | 8/1998 | Tisma | ...................... | B65B 5/06 53/244 |
| 7,089,717 B2 * | 8/2006 | Guttinger | ............... | B65B 5/068 53/251 |
| 7,191,892 B2 * | 3/2007 | Monti | ..................... | B65B 35/58 198/369.3 |
| 7,597,528 B2 * | 10/2009 | Rodi | ..................... | B65G 47/82 198/419.1 |
| 8,056,704 B2 * | 11/2011 | Christ | ................... | B65B 35/405 198/617 |
| 8,672,117 B2 * | 3/2014 | Stahl | ...................... | B65B 23/14 198/418.1 |
| 9,021,773 B2 * | 5/2015 | Ford | ......................... | B65B 5/04 198/377.02 |
| 9,102,109 B2 * | 8/2015 | Herrmann | ........... | B29D 11/0023 |

* cited by examiner

DEVICE FOR TRANSFERRING STACKS OF BLISTER PACKS

RELATED APPLICATIONS

The present patent document claims the benefit of priority to European Patent Application No. EP 13190537.4, filed Oct. 28, 2013, the entire contents of which are incorporated herein by reference.

FIELD AND BACKGROUND OF THE INVENTION

The present invention relates to a device for transferring stacks of blister packs to a conveying device.

Blister packs are frequently used in the pharmaceutical industry for the packaging of medications. First, a plurality of pockets are formed in a web of sheet material, and then products such as tablets or coated tablets are introduced into the pockets. Next, the web of sheet material with the filled pockets is sealed with a lidding sheet and sent to a stamping station, where the individual blister packs are stamped out of the web of sheet material.

After that, the blister packs are placed in stacks in the individual compartments of a conveying device. Finally, the stacks of blister packs arranged on the conveying device are sent to a packaging station, in which the stacks of blister packs are introduced into appropriate packages such as folding boxes.

To achieve the highest possible throughput of the packaging machine, the conveying device is preferably operated continuously. For this reason, appropriate transfer devices are required to transfer the stacks of blister packs from the stamping station to the conveying device of the packaging machine.

SUMMARY OF THE INVENTION

It is an object of the present invention to provide an improved device for transferring and conveying stacks of blister packs, in which the stacks of blister packs are transferred more efficiently and more reliably.

According to an aspect of the invention, the device for transferring and conveying stacks of blister packs has a transfer device and a conveying device. The transfer device serves to transfer the stacks of blister packs to the conveying device, and the conveying device serves to convey the stacks of blister packs further in a conveying direction. The conveying device has several compartments or carts for holding the stacks of blister packs, the compartments or carts traveling around a circuit. The transfer device comprises at least one transfer cassette configured to hold a stack of blister packs, the cassette comprising a bottom element and at least two opposing side boundary elements, and at least one transfer cassette motion unit for moving the transfer cassette in the conveying direction and in a direction transverse to the conveying direction. The transfer cassette motion unit is configured in such a way that the transfer cassette is movable, preferably by translational movement and preferably in the conveying direction, from a loading position, in which blister packs are loaded into it, to an unloading position, in which the blister packs are transferred to a compartment or a cart of the conveying device. The transfer cassette motion unit is further configured in such a way that the transfer cassette can be moved laterally and thus transversely to the conveying direction out of the compartment or the cart of the conveying device and thus out of the unloading position during unloading, whereas the stack of blister packs remains behind on the conveying device.

Because the stack of blister packs is located between the side boundary elements of the transfer cassette during the movement of the conveying device, the blister pack stacks can be moved in a vertically stable condition until they are transferred to a compartment or cart. After the outward lateral movement of the transfer cassette, the stack of blister packs remains in the compartment or cart of the conveying device, so that a stable condition is again guaranteed.

A stop element is preferably provided, against which the stack of blister packs rests, so that the stack is retained in the compartment or cart of the conveying device when the transfer cassette is moved laterally out of the conveying device. As a result, the transfer cassette can be pulled reliably out from under the stack of blister packs, whereas the stop element additionally ensures the flush vertical alignment and stabilization of the stack.

In a special embodiment, the stop element is configured as a movable pusher element, which is arranged on the transfer cassette motion unit. This makes it possible to adjust the relative position of the stop element versus the transfer cassette on the transfer cassette motion unit in such a way that the stack of blister packs remains reliably in an exact, predefined position in the conveying device after the transfer cassette has been pulled out.

It is advantageous for the transfer cassette motion unit to be configured in such a way that it moves in the conveying direction of the conveying device when the transfer cassette is moving from the loading position to the unloading position. It is advantageous in this case for the transfer cassette, on which the stack of blister packs is arranged, to be brought up to the speed of the conveying device and moved along with it even before the cassette is pulled out from the compartment or cart. This accordingly promotes the smooth and reliable transfer of the stack of blister packs to the conveying device.

It is also advantageous for the transfer cassette motion unit to be configured in such a way that, after the transfer cassette has been moved out of the compartment or cart transversely to the conveying direction, it is moved first in the direction opposite the conveying direction and then in a direction transverse to the conveying direction and thus into the loading position. Through the movement of the transfer cassette from the loading position to the unloading position and back to the loading position, an endlessly repeating cycle of movement results, which is technically easy to realize.

The movement producing the lateral removal of the transfer cassette from the conveying device involves a combination movement, composed of a movement in the conveying direction and a movement transverse to the conveying direction. The advantage here is that, while the transfer cassette is being pulled out, the transfer cassette is still being carried along in the conveying direction, as a result of which a seamless transfer of the stack of blister packs to the continuously moving conveying device is possible and thus a high throughput can be achieved.

In a special embodiment, the side boundary elements of the transfer cassette are arranged so that they are substantially transverse to the conveying direction, and each transfer cassette is open on the side facing away from the corresponding transfer cassette motion unit. When the transfer cassette is pulled out, the stack of blister packs can leave the transfer cassette through this open side, whereas the two side elements ensure a stable vertical alignment of the stack at the time of transfer.

A longitudinal guide device is preferably assigned to the at least one transfer cassette motion unit. The transfer cassette motion unit can be moved back and forth along this guide device, parallel to the conveying direction. As a result, positive guidance in the longitudinal direction is realized, which makes it possible for the transfer cassette to be moved with precision parallel to the conveying direction at all times.

In addition, the at least one transfer cassette motion unit is equipped with a transverse guide device, along which the transfer cassette can be moved back and forth transversely to the conveying direction. This again guarantees the precise determination of the transverse movement component of the transfer cassette.

The transfer cassette motion unit is preferably configured in such a way that the movement of the transfer cassette motion unit along the longitudinal guide device and the movement of the transfer cassette along the transverse guide device proceed independently of each other. Individual adaptation to the geometric relationships of the conveying device is thus possible by controlling the longitudinal and transverse movements of the transfer cassettes as appropriate.

The overall throughput of the transfer device can be doubled by providing a total of two transfer cassettes, installed on opposite sides of the conveying device, each with its own transfer cassette motion unit.

The movements of the two transfer cassettes from the loading position to the unloading position and back to the loading position define a cycle. The transfer cassette motion units can be controlled in such a way that the two transfer cassettes execute opposite movements offset in time by half a cycle. It is thus possible for the two transfer cassettes to be brought in alternation into the same loading position and for only a single stack-forming station to be sufficient.

Finally, all of the movements of the transfer cassette proceed in a single horizontal plane, which is parallel to the conveying direction of the conveying device. The transfer cassettes therefore do not have to be moved vertically. This simplifies the technical implementation of the device.

BRIEF DESCRIPTION OF THE DRAWINGS

Additional features and advantages of the present invention can be derived from the following description, which refers to the drawings.

FIGS. 1A-1I are perspective views of a preferred embodiment of the device according to the invention, in which the various phases of the transfer movement of a first transfer cassette and a second transfer cassette are shown;

DETAILED DESCRIPTION OF SPECIFIC EMBODIMENTS

Figure 1A:
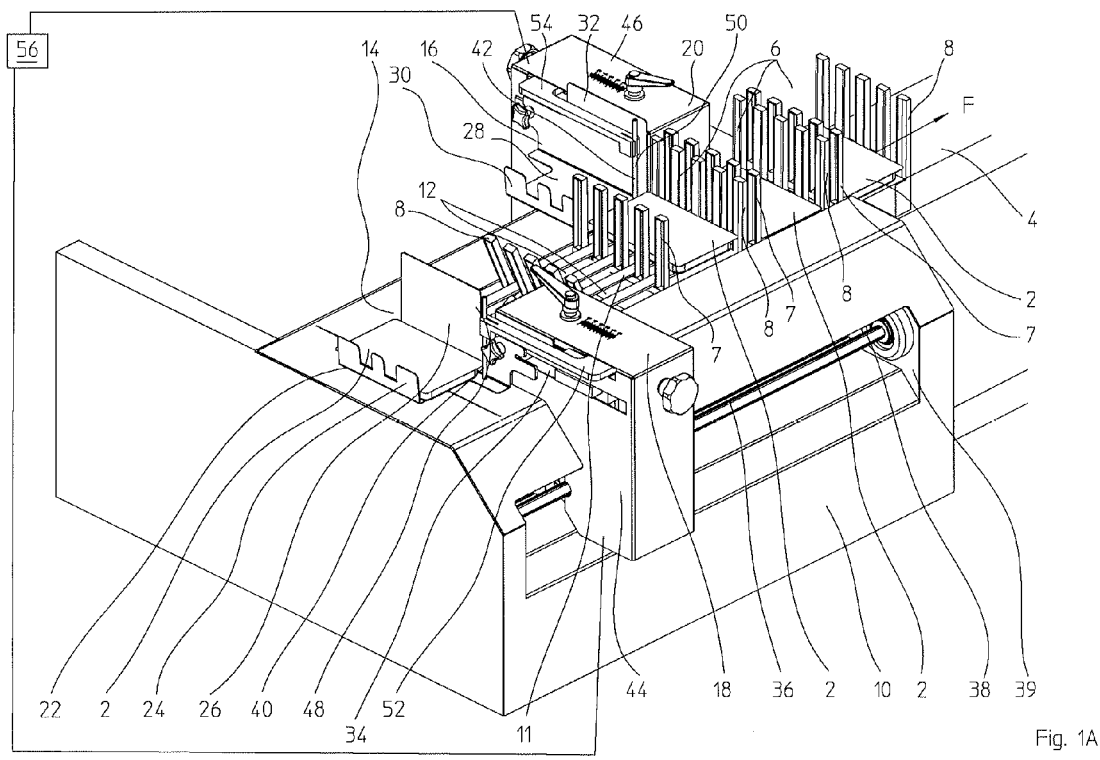

FIG. 1A shows a preferred embodiment of a device according to the invention. The device has a transfer device for transferring stacks 2 of blister packs to a conveying device 4, which in turn serves for conveying the stacks 2 of blister packs further in a conveying direction F. It should be noted that, in the diagrams of FIGS. 1-3, each stack 2 of blister packs comprises only a single pack. A stack 2 of blister packs 2 can, of course, comprise several blister packs arranged one on top of the other.

The transfer device is used in particular to move the stacks 2 of blister packs, which have been picked up in a loading position (FIG. 1A), to the compartments 6 of the conveying device 4, which is moving in the conveying direction F. To form the stacks 2 of blister packs, a stack-forming unit (not shown) is provided. A dispensing unit (not shown) is provided to arrange the stacks 2 of blister packs in the transfer cassette while the transfer cassette is in the loading position.

The conveying device 4 shown in the drawings is configured in the form of a transport chain for the goods to be packaged. The conveying device 4 comprises several compartments 6, each of which holds one stack 2 of blister packs. Each of the compartments 6 is formed by rear and front separating walls 7, 8, oriented transversely to the conveying direction F. It is also possible, however, in the case of another conveying chain for goods to be packaged, for two compartments 6 adjacent to each other in the conveying direction F to be separated from each other only by a single separating wall. In particular, the separating walls 7, 8 are configured as fork-like, multi-fingered partitions. It is also conceivable that the conveying device 4 could be configured as a linear motor conveyor. In this case, individually actuated carts take over the function of the compartments 6.

As also shown in FIG. 1A, the transfer device comprises a housing 10. The housing 10 has a top side, on which a slide section 11 is formed, which corresponds to the path along which the stack 2 of blister packs moves and which comprises several slots 12 extending in the conveying direction F. The finger elements of the separating walls 7, 8 pass through these slots 12 to form the compartments 6, each of which holds a stack 2 of blister packs.

The transfer device also comprises first and second transfer cassettes 14, 16 as well as a first transfer cassette motion unit 18 assigned to the first transfer cassette 14 and a second transfer cassette motion unit 20 assigned to the second transfer cassette 16. The first transfer cassette 14 comprises a bottom element 22 and side boundary walls 24, 26 at the rear and front, wherein each side boundary wall 24, 26 is arranged so that it is transverse to the conveying direction F and projects vertically up from the bottom element 22. The second transfer cassette 16 comprises a bottom element 28 and side boundary walls 30, 32 at the rear and front, wherein each side boundary wall 30, 32 is again arranged so that it is transverse to the conveying direction F and projects vertically up from the bottom element 28. The two side boundary walls 26, 32 at the front are higher than the side boundary walls 24, 30 at the rear.

Whereas the transfer cassettes 14, 16 on their assigned transfer cassette motion units 18, 20 are supported movably on their associated transverse guide devices 34, 35 in the direction transverse to the conveying direction F, the transfer cassette motion units 18, 20 are supported movably in the conveying direction F on their associated longitudinal guide devices 36, which are provided on the housing 10. The transfer cassette motion units 18, 20 are supported movably in the longitudinal direction in such a way that they are movable parallel to the conveying direction 4.

The transfer cassettes 14, 16 are in turn supported movably in the transverse direction on their assigned transfer cassette motion units 18, 20 in such a way that each transfer cassette is movable into a compartment 6 and also into a position laterally next to the transport chain for packaged goods 5. The longitudinal guide device 36 consists of a longitudinal guide rail 38, which is provided in a recess in a side wall of the housing 10. A servomotor (not shown) is assigned to each transfer cassette motion unit 18, 20. These servomotors can be actuated independently of each other to bring about the longitudinal and transverse movements.

The transfer cassette motion units 18, 20 comprise in each case a substantially triangular housing 44, 46, which is arranged movably in the longitudinal direction next to the slide section 11 on the housing 10. The transfer cassettes 14, 16 are attached movably in the transverse direction to the sides of the housing 44, 46 located at the rear with respect to the conveying direction F. In addition, pusher elements 40, 42 are provided, one of which is arranged on the side at the rear with respect to the conveying direction of each of the housings 44, 46 of the transfer cassette motion units 18, 20. Each pusher element 44, 46 consists of a rod-shaped element 48, 50, which is attached by means of a horizontally oriented, L-shaped mounting arm 52, 54 to the transfer cassette motion unit 18, 20. The L-shaped mounting arms 52, 54 are arranged adjustably in the transverse direction on the transfer cassette motion units 18, 20, so that each pusher element 40, 42 can be arranged in various positions relative to the housing 44, 46.

Figure 2:
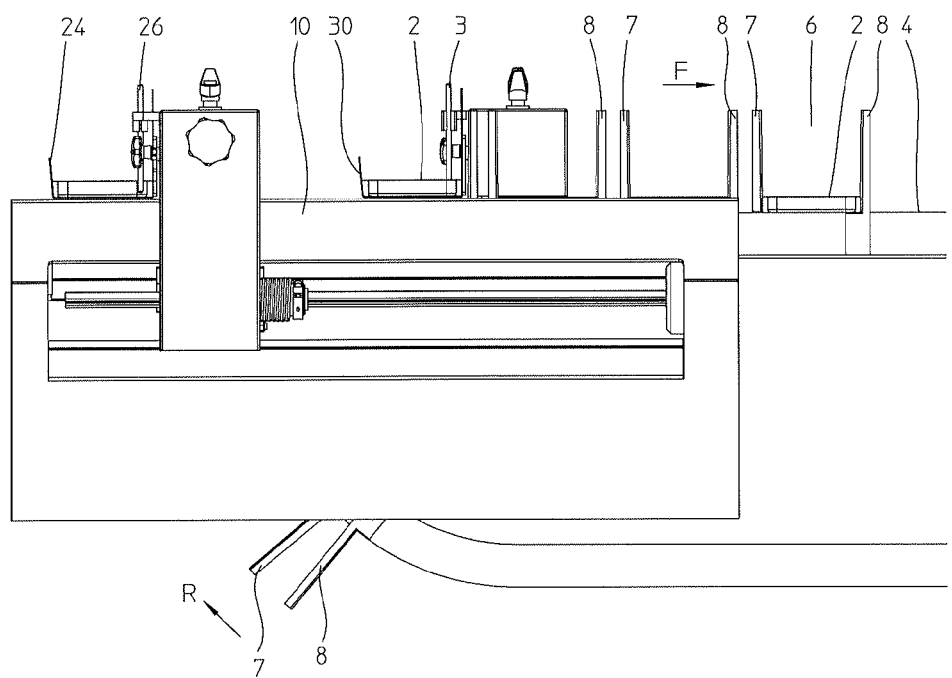
FIG. 2 is a side view of the device of FIGS. 1A-1I.

FIG. 2 shows only the left part of the continuously moving, endless conveying device 4. The conveying device 4 comprises an upper run moving in the conveying direction F and a lower run moving in the return direction R, opposite the conveying direction F. After the return movement and at the point where the reversal of direction occurs, the multi-fingered separating walls 7, 8 are guided through the longitudinal slots 12 of the transfer housing 10 in order to form the compartments 6, which hold the stacks of blister packs on the top side of the housing 10. Each compartment 6 comprises a rear separating wall 7 and an associated forward separating wall 8, wherein the rear separating wall 7 of a leading compartment 6 is a certain distance away in each case from the forward separating wall 8 of the trailing compartment, i.e., trailing with respect to the conveying direction F.

Figure 3:
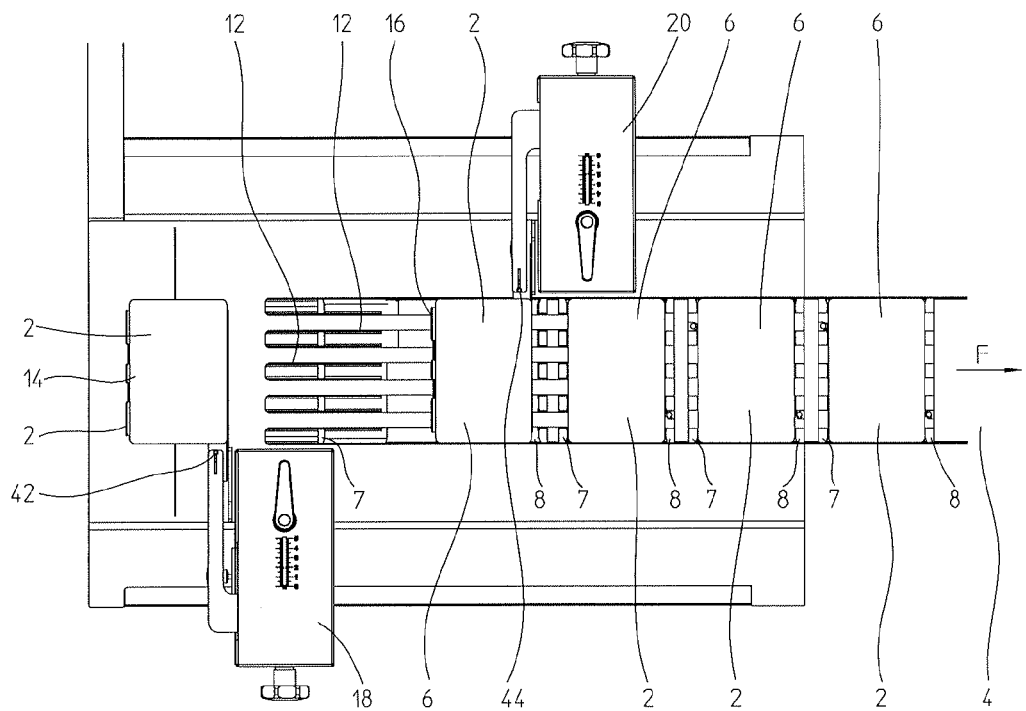
FIG. 3 is a top view of the device of FIGS. 1A-1I.

In the top view of FIG. 3, furthermore, it is shown how the transfer cassette 16, which is being moved in the conveying direction F by the transfer cassette motion unit 20, gradually approaches the front separating wall 8 of the associated compartment 6, and how the rear separating wall 7, which is still a certain distance away from the transfer cassette 16, is being moved through the slots 12. As can be seen in the example of the stacks 2 of blister packs already deposited in the compartments 6, these stacks rest closely against the separating walls 7, 8. It can also easily be understood from FIG. 3 that the two transfer cassettes 14, 16 travel continuously around their circuits. The first transfer cassette 14 moves in the clockwise direction, while the second transfer cassette 16 moves in the counterclockwise direction.

In the following, the course of the movements of the transfer device resulting from the two cycles of movement of the transfer cassettes 14, 16 is described in greater detail on the basis of FIGS. 1A-1I. The two transfer cassettes 14, 16 are actuated by way of a control unit 56 (FIG. 1A), which thus controls all of the movement sequences described below.

In FIG. 1A, the first transfer cassette 14, located in the foreground of the drawing, is in the starting position of a movement cycle. In the present case, the starting position also corresponds to the loading position, in which each transfer cassette 14, 16 is loaded with a stack 2 of blister packs. The first transfer cassette 14 is located directly behind the rear of the conveying device 4 relative to the conveying direction. The second transfer cassette 16 is located downstream, relative to the conveying direction, of the first transfer cassette 14, namely, laterally next to the path of movement of the conveying device 4, in which a stack 2 of blister packs has already been placed.

Figure 1B:
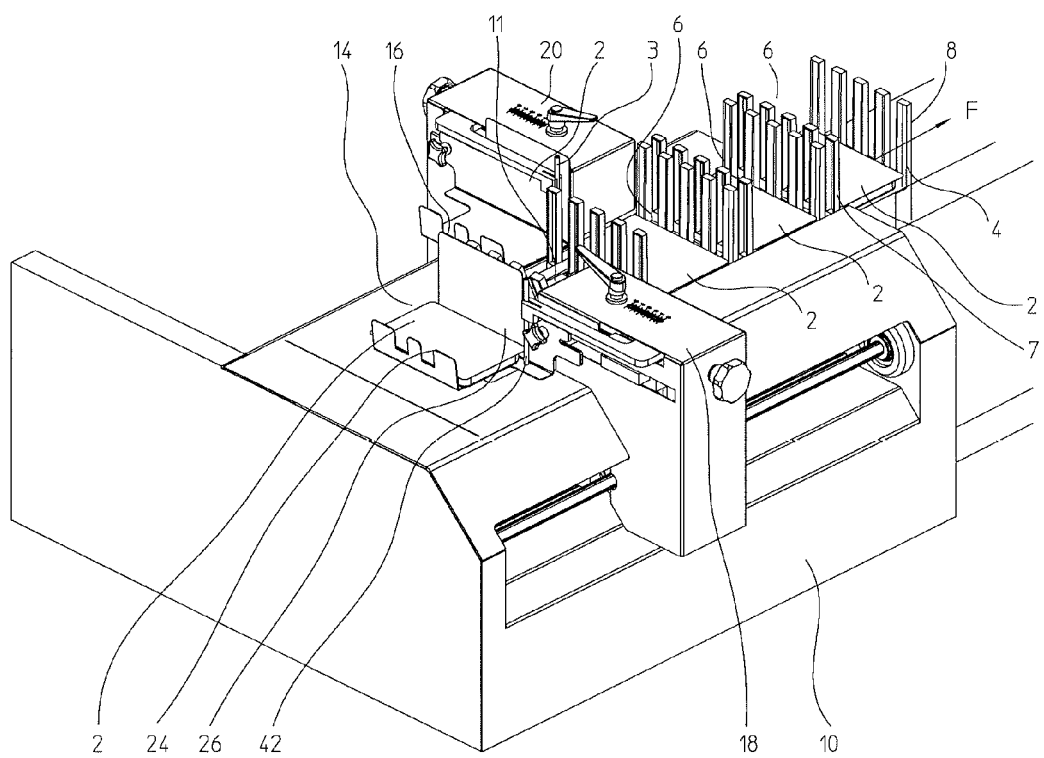

It can be seen in FIG. 1B that—in a phase following that shown in FIG. 1A—the first transfer cassette 14 has been moved onward in the conveying direction F, so that now approximately half of it is located on the slide section 11 of the housing 10. The second transfer cassette 16—in a phase following that shown in FIG. 1A—has been moved back in the direction opposite the conveying direction F.

Figure 1C:
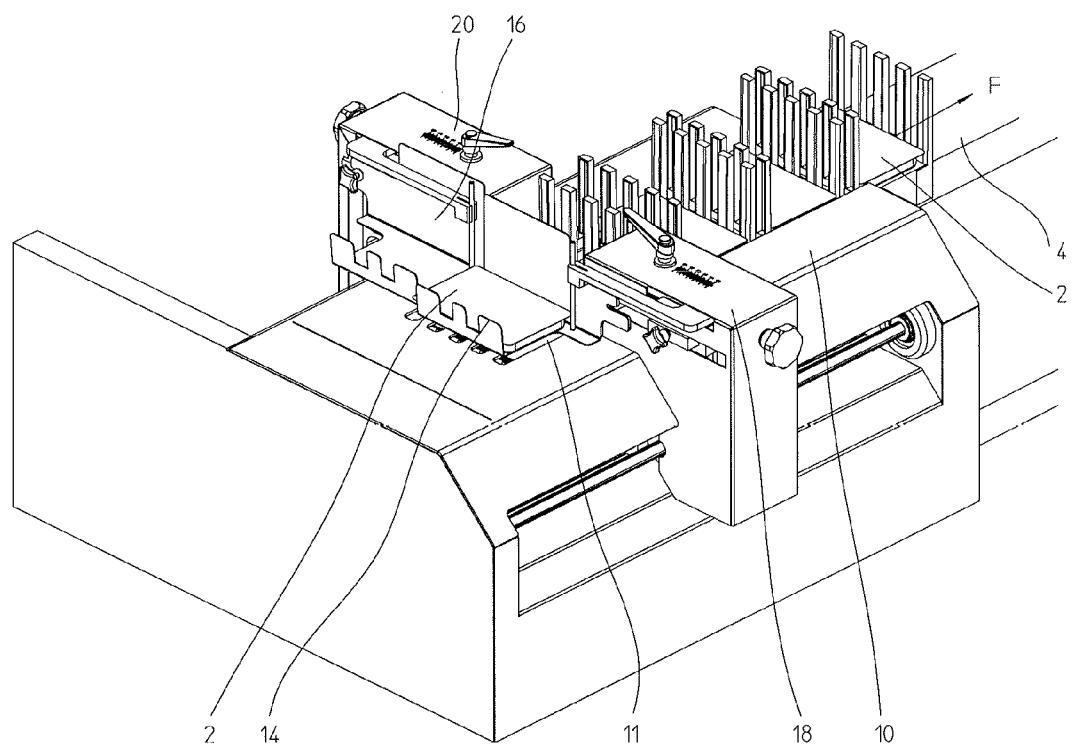

It can be seen in FIG. 1C that—in a phase following that shown in FIG. 1B—all of the transfer cassette 14 is now situated on the slide section 11, whereas the transfer cassette motion unit 20 and thus the transfer cassette 16 have been moved along the longitudinal guide device (not shown) to such an extent in the direction opposite the conveying direction F that the first and second transfer cassettes 14, 16 are now located next to each other.

Figure 1D:
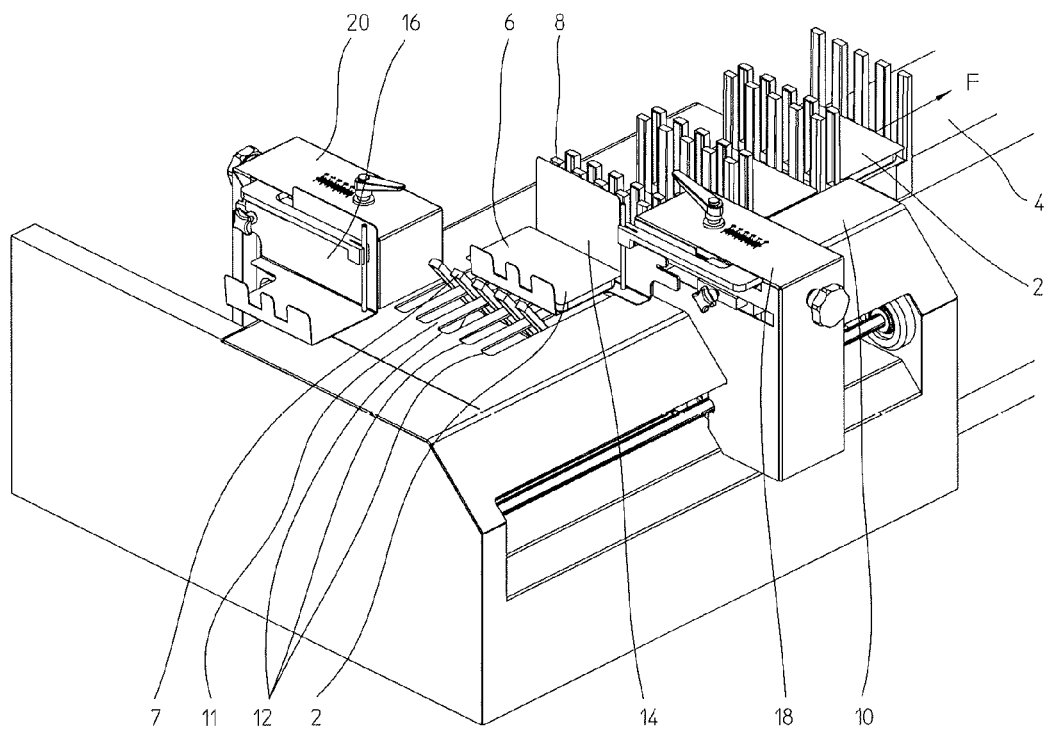

It can be seen in FIG. 1D that—in a phase following that shown in FIG. 1C—the two transfer cassettes 14, 16 have now been moved past each other. The transfer cassette 14 is situated in a compartment 6, which is bounded by the rear and front separating walls 7, 8. The finger elements of the rear separating wall 7 have moved only partially through the slots 12 and are oriented at an angle to the slide surface 11. The transfer cassette 16—in a phase following that shown in FIG. 1C—has been moved back toward the rear by the transfer cassette motion unit 20 to such an extent that it is now located directly behind the slide surface 11 but to one side of the path of movement of the conveying device 4.

Figure 1E:
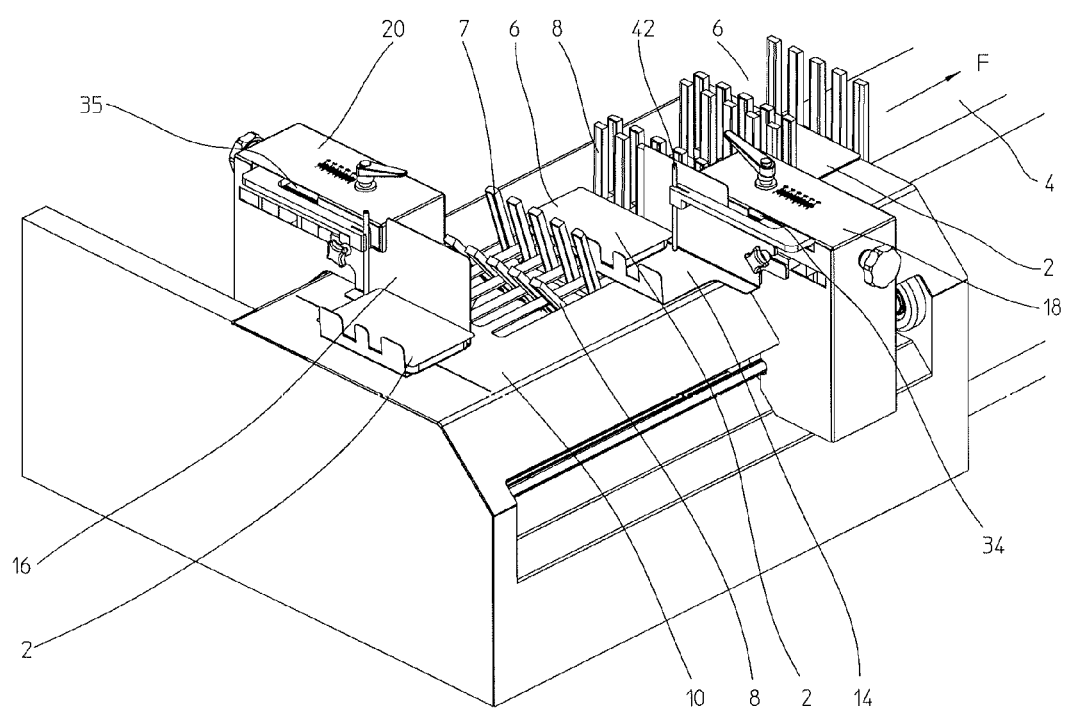

It can be seen in FIG. 1E that—in a phase following that shown in FIG. 1D—the transfer cassette 14 has been moved onward in the conveying direction F, and the fingers of the rear separating wall 7 have been moved further upward toward a vertical orientation. In contrast, the transfer cassette motion unit 20 has caused the transfer cassette 16 to move in the transverse direction, so that now the transfer cassette 16 is located in the starting position. In this starting position, the second transfer cassette 16 is located directly behind the rear of the conveying device 4, i.e., behind it relative to the conveying direction F. The first transfer cassette 14 is located downstream relative to the conveying direction F of the second transfer cassette 16 and has already been pulled partially out of the compartment 6 of the conveying device 4 in the direction transverse to the conveying direction, wherein the stack 2 of blister packs is retained in the compartment 6 by the pusher element 42.

Figure 1F:
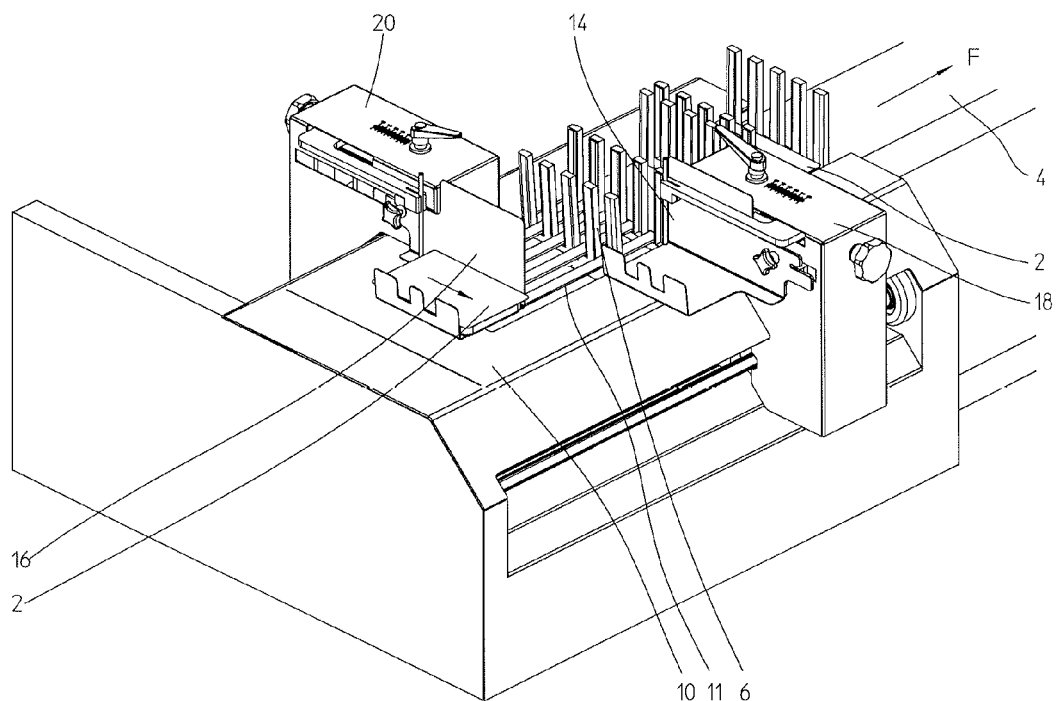

It can be seen in FIG. 1F that—in a phase following that shown in FIG. 1E—the second transfer cassette 16 has been moved further onward in the conveying direction F, and approximately half of it is now located on the slide section 11 of the housing 10. The first transfer cassette 14—in a phase following that shown in FIG. 1E—has been moved back in the direction opposite the conveying direction F.

Figure 1G:
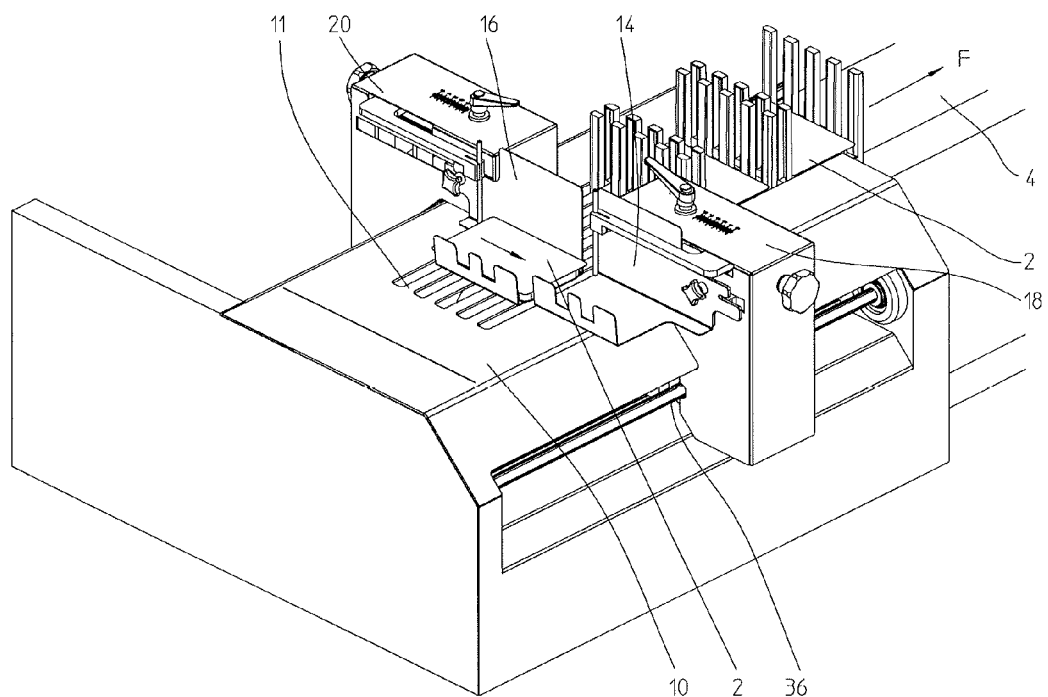

It can be seen in FIG. 1G that—in a phase following that shown in FIG. 1E—all of the second transfer cassette 16 is now located on the slide surface 11, whereas the transfer cassette motion unit 18 and thus the first transfer cassette 14 have been moved along the longitudinal guide device 36 in the direction opposite the conveying direction F to such an extent that the first and second transfer cassettes 14, 16 are now located on the same level.

Figure 1H:
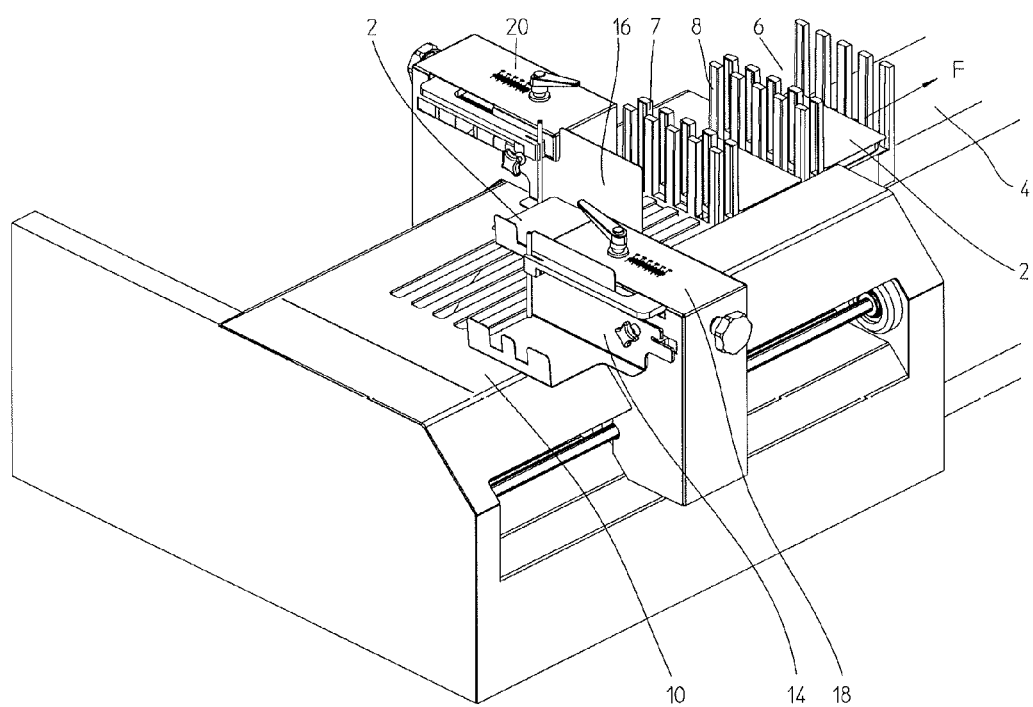
Figure 11:
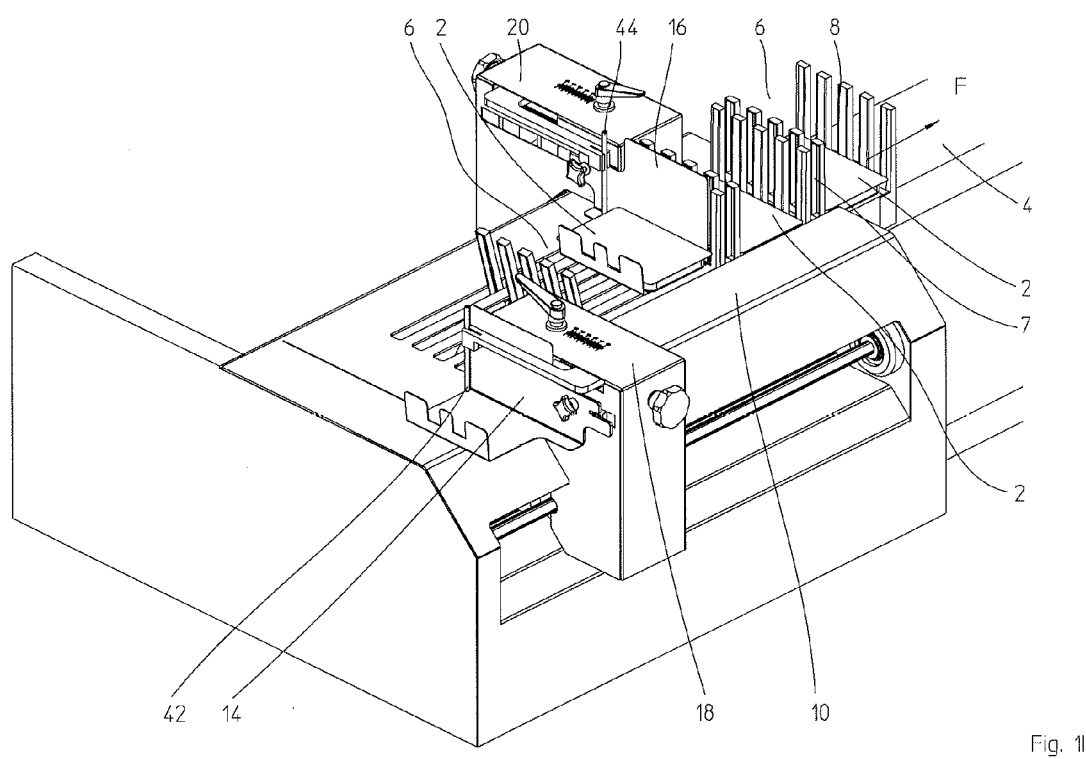

It can be seen in FIG. 1H that—in a phase following that shown in FIG. 1G—the second transfer cassette 16 with the stack 2 of blister packs has been moved further onward in the conveying direction F, and that the first transfer cassette 14 has been moved further back in the direction opposite the conveying direction F.

It can be seen in FIG. 1I that—in a phase following that shown in FIG. 1H—the second transfer cassette 16 with the stack 2 of blister packs has been moved further onward in the conveying direction F, and that the first transfer cassette 14 has been moved further back in the direction opposite the conveying direction F.

The first transfer cassette 14 can now be moved from the position shown in FIG. 1I transversely to the conveying direction F into the starting position so that it can be loaded with a stack 2 of blister packs. The second transfer cassette 16 can be moved from the position shown in FIG. 1I out of the compartment 6 transversely to the conveying direction, wherein the stack 2 of blister packs rests against the slide element 44 and therefore remains in the compartment 6. The transfer cassettes 14, 16 are then in the positions shown in FIG. 1A, and a full movement cycle of the transfer device is completed.

In addition to the embodiment illustrated concretely here, many variations of the present invention are also possible. For example, only one transfer cassette 14 or 16 can be provided. The concrete geometric configuration of the transfer cassettes 14, 16 and of the pusher elements 40, 42 and their drive and guide devices can also be varied by the person skilled in the art.

The invention claimed is:

1. A device for transferring and conveying stacks of blister packs, the device having a transfer device and a conveying device, the transfer device serving to transfer the stacks of blister packs to the conveying device, and the conveying device serving to convey the stacks of blister packs in a conveying direction;
   wherein the conveying device has several compartments or carts for holding the stacks of blister packs, the compartments or carts traveling around a circuit,
   wherein the transfer device comprises at least one transfer cassette for holding one of the stacks of blister packs, the transfer cassette comprising a bottom element and at least two opposing side boundary elements, and further comprises at least one transfer cassette motion unit, actuated by a control unit, for moving the at least one transfer cassette in a direction transverse to the conveying direction;
   wherein the at least one transfer cassette motion unit is actuated in such a way that the at least one transfer cassette is moved from a loading position, in which the at least one transfer cassette is loaded with a stack of blister packs, to an unloading position, in which the one of the stacks of blister packs is transferred to one of the compartments or carts of the conveying device,
   wherein the at least one transfer cassette motion unit is actuated in such a way that the at least one transfer cassette is moved in the conveying direction when moved from the loading position to the unloading position;
   wherein, during unloading, the at least one the transfer cassette is moved laterally out of the one of the compartments or carts of the conveying device and thus out of the unloading position in the direction transverse to the conveying direction, whereas the one of the stacks of blister packs remains on the conveying device; and
   wherein a movement of the at least one transfer cassette from the loading position to the unloading position and back to the loading position again is an endlessly repeated movement around a circuit.

2. The device according to claim 1, further comprising a stop element, against which the one of the stacks of blister packs rests so that the one of the stacks of blister packs is retained in the one of the compartments or carts when the at least one transfer cassette is moved laterally out of the conveying device.

3. The device according to claim 2, wherein the stop element is a movable pusher element, which is arranged on the at least one transfer cassette motion unit.

4. The device according to claim 1, wherein the at least one transfer cassette motion unit is actuated in such a way that, as the at least one transfer cassette is moved from the loading position to the unloading position, the at least one transfer cassette is moved in the conveying direction of the conveying device.

5. The device according to claim 1, wherein the at least one transfer cassette motion unit is actuated in such a way that, after the at least one transfer cassette has been moved out of the one of the compartments or carts transversely to the conveying direction, the at least one transfer cassette is moved first in a direction opposite to the conveying direction and then in a direction transverse to the conveying direction into the loading position.

6. The device according to claim 1, wherein a movement producing a lateral removal of the at least one transfer cassette from the conveying device is a combination movement, which is composed of a movement in the conveying direction and a movement transverse to the conveying direction.

7. The device according to claim 1, wherein the side boundary elements of the at least one transfer cassette are arranged substantially transversely to the conveying direction.

8. The device according to claim 1, wherein the at least one transfer cassette is open on a side facing away from the at least one transfer cassette motion unit.

9. The device according to claim 1, wherein a longitudinal guide device is assigned to the at least one transfer cassette motion unit, along which guide device the at least one transfer cassette motion unit is moved back and forth parallel to the conveying direction.

10. The device according to claim 9, wherein the at least one transfer cassette motion unit comprises a transverse guide device, along which the at least one transfer cassette is moved back and forth transversely to the conveying direction.

11. The device according to claim 10, wherein the at least one transfer cassette motion unit is actuated in such a way that a movement of the at least one transfer cassette motion unit along the longitudinal guide device and a movement of the at least one transfer cassette along the transverse guide device proceed independently of each other.

12. A device for transferring and conveying stacks of blister packs, the device having a transfer device and a conveying device, the transfer device serving to transfer the stacks of blister packs to the conveying device, and the conveying device serving to convey the stacks of blister packs in a conveying direction;
    wherein the conveying device has several compartments or carts for holding the stacks of blister packs, the compartments or carts traveling around a circuit,
    wherein the transfer device comprises at least one transfer cassette for holding one of the stacks of blister packs, the transfer cassette comprising a bottom element and at least two opposing side boundary elements, and further comprises at least one transfer cassette motion unit, actuated by a control unit, for moving the at least one transfer cassette in a direction transverse to the conveying direction;
    wherein the at least one transfer cassette motion unit is actuated in such a way that the at least one transfer cassette is moved from a loading position, in which the at least one transfer cassette is loaded with a stack of blister packs, to an unloading position, in which the one of the stacks of blister packs is transferred to one of the compartments or carts of the conveying device,
    wherein the at least one transfer cassette motion unit is actuated in such a way that the at least one transfer cassette is moved in the conveying direction when moved from the loading position to the unloading position;
    wherein, during unloading, the at least one the transfer cassette is moved laterally out of the one of the compartments or carts of the conveying device and thus out of the unloading position in the direction transverse to the conveying direction, whereas the one of the stacks of blister packs remains on the conveying device; and wherein the at least one transfer cassettes comprises first and second transfer cassettes, and further comprising first and second transfer cassette motion units, which are arranged on opposite sides of the conveying device.

13. The device according to claim 12, wherein a movement of the at least one transfer cassette from the loading position to the unloading position and back to the loading position again is an endlessly repeated movement around a circuit.

14. The device according to claim 12, wherein movements of the first and second transfer cassettes from the loading position to the unloading position and back to the loading position define a cycle, and wherein the first and second transfer cassette motion units are controlled in such a way that the first and second transfer cassettes execute opposite movements which are offset in time from each other by half a cycle.

15. The device according to claim 14, wherein all movements of the first and second transfer cassettes take place in a horizontal plane which is parallel to the conveying direction of the conveying device.

16. The device according to claim 12, wherein all movements of the first and second transfer cassettes take place in a horizontal plane which is parallel to the conveying direction of the conveying device.

17. The device according to claim 12, further comprising a stop element, against which the one of the stacks of blister packs rests so that the one of the stacks of blister packs is retained in the one of the compartments or carts when the at least one transfer cassette is moved laterally out of the conveying device.

18. The device according to claim 17, wherein the stop element is a movable pusher element, which is arranged on the at least one transfer cassette motion unit.

19. The device according to claim 12, wherein the at least one transfer cassette motion unit is actuated in such a way that, as the at least one transfer cassette is moved from the loading position to the unloading position, the at least one transfer cassette is moved in the conveying direction of the conveying device.

20. The device according to claim 12, wherein the at least one transfer cassette motion unit is actuated in such a way that, after the at least one transfer cassette has been moved out of the one of the compartments or carts transversely to the conveying direction, the at least one transfer cassette is moved first in a direction opposite to the conveying direction and then in a direction transverse to the conveying direction into the loading position.

* * * * *